(12) United States Patent
Si et al.

(10) Patent No.: US 11,463,214 B2
(45) Date of Patent: Oct. 4, 2022

(54) QUASI CO-LOCATION CONFIGURATION METHOD, TERMINAL, AND NETWORK DEVICE

(71) Applicant: VIVO MOBILE COMMUNICATION CO., LTD., Guangdong (CN)

(72) Inventors: Ye Si, Chang'an Dongguan (CN); Peng Sun, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 39 days.

(21) Appl. No.: 17/093,330

(22) Filed: Nov. 9, 2020

(65) Prior Publication Data

US 2021/0058212 A1    Feb. 25, 2021

Related U.S. Application Data

(63) Continuation of application No. PCT/CN2019/086126, filed on May 9, 2019.

(30) Foreign Application Priority Data

May 11, 2018    (CN) .................. 201810451283.X

(51) Int. Cl.
  *H04L 5/00*    (2006.01)
  *H04W 72/04*    (2009.01)

(52) U.S. Cl.
  CPC ......... *H04L 5/0048* (2013.01); *H04W 72/042* (2013.01)

(58) Field of Classification Search
  CPC .................. H04L 5/0048; H04W 72/042
  See application file for complete search history.

(56) References Cited

U.S. PATENT DOCUMENTS

| | | |
|---|---|---|
| 2016/0119936 A1 | 4/2016 | Kim et al. |
| 2018/0062807 A1 | 3/2018 | Seo et al. |
| 2018/0175983 A1 | 6/2018 | Yum et al. |
| 2019/0132099 A1 | 5/2019 | Wu et al. |
| 2019/0190672 A1 | 6/2019 | Kim et al. |
| 2019/0229792 A1* | 7/2019 | Wilson ............... H04W 72/046 |

(Continued)

FOREIGN PATENT DOCUMENTS

| | | |
|---|---|---|
| CN | 105308889 A | 2/2016 |
| CN | 107294643 A | 10/2017 |
| CN | 107734514 A | 2/2018 |

(Continued)

OTHER PUBLICATIONS

European Search Report dated May 3, 2021 as received in application No. 19799963.4.

(Continued)

*Primary Examiner* — Ronald B Abelson
(74) *Attorney, Agent, or Firm* — Maschoff Brennan

(57) ABSTRACT

A configuration method for tracking reference signal, a terminal and a network device are provided. The method includes: in a case that a network device configures an aperiodic reference signal quasi-co-located with a physical channel or a physical signal, determining, according to a preset manner, that the aperiodic reference signal or a target physical signal associated with the aperiodic reference signal is a quasi co-location signal of the physical channel or the physical signal.

20 Claims, 4 Drawing Sheets

(56) References Cited

U.S. PATENT DOCUMENTS

2019/0260452 A1    8/2019  Zhang et al.
2021/0136733 A1*   5/2021  Miao .................... H04L 5/0048

FOREIGN PATENT DOCUMENTS

| CN | 107771378 A   | 3/2018 |
| WO | 2018/030849 A1 | 2/2018 |
| WO | 2018038556 A1 | 3/2018 |

OTHER PUBLICATIONS

"Summary #2 for TRS" 3GPP TSG-RAN WG1 Meeting #92bis, R1-1805694, Sanya, China, Apr. 16-20, 2018. MediaTek Inc.
"Further discussion on introducing aperiodic TRS" 3GPP TSG RAN WG1 Meeting #92bis, R1-1804443, Sanya, China, Apr. 16-20, 2018. Huawei, HiSilicon.
"Summary #2 for TRS" 3GPP TSG-RAN WG1 Meeting #92, R1-1803438, Athens, Greece, Feb. 26-Mar. 2, 2018. MediaTek Inc.
Chinese Office Action issued in corresponding application No. 201810451283.X, dated Apr. 13, 2020.
Japanese Office Action from corresponding JP Application No. 2020563723, dated Dec. 16, 2021.
Nokia, "Feature Lead Summary on QCL," 3GPP R1-1805660, Apr. 16-20, 2016, 24 pages, Sanya, China.
Samsung, "QCL Associations for Beam Management RS," 3GPP R1-1717624, Oct. 9-13, 2017, 3 pages, Prague, CZ.
Intel Corporation, "On Remaining Details of QCL for NR," 3GPP R1-1720080, Nov. 27-Dec. 1, 2017, 3 pages, Reno, USA.
Huawei, "Further Discussion on Introducing Aperiodic TRS," 3GPP R1-1804443, Apr. 16-20, 2018, 3 pages, Sanya, China.

* cited by examiner

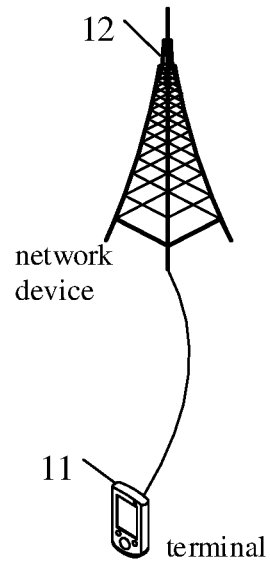

network device 11 terminal

Fig. 1

| in a case that a network device configures an aperiodic reference signal quasi-co-located with a physical channel or a physical signal, determining, according to a preset manner, that the aperiodic reference signal or a target physical signal associated with the aperiodic reference signal is a quasi co-location signal of the physical channel or the physical signal | 21 |

Fig. 2 though it may fail to detect the DCI. Moreover, the terminal may fail to determine the parameter information, such as the Doppler shift, the Doppler spread, the average delay and the delay spread, of the physical channel or the physical signal for which the aperiodic reference signal is used as the QCL source reference signal, which may lead to a failure in determining the large-scale parameter of the physical channel or the physical signal.

QUASI CO-LOCATION CONFIGURATION METHOD, TERMINAL, AND NETWORK DEVICE

CROSS-REFERENCE TO RELATED APPLICATION

This application is a continuation application of PCT Application No. PCT/CN2019/086126 filed on May 9, 2019, which claims a priority to Chinese Patent Application No. 201810451283.X filed in China on May 11, 2018, disclosure of which are incorporated in their entirety by reference herein.

TECHNICAL FIELD

The present disclosure relates to the field of communications technology, in particular to a quasi co-location configuration method, a terminal and a network device.

BACKGROUND

In the fifth generation (5G) mobile communication system, in order to improve reliability of the system, it is necessary to accurately estimate a frequency offset, a time offset, a Doppler shift, a Doppler spread and a delay spread of the system.

In a case that signals of two antenna ports satisfy a quasi co-location (QCL) relationship, the two groups of signals have approximately the same experience in regard to at least one of a channel Doppler shift, a channel Doppler spread, an channel average delay, a channel delay spread or a channel spatial reception parameter, and a same reference signal may be used for large-scale parameter determination. There may be the following QCL types:

QCL type A, its quasi co-location parameters including: a Doppler shift, a Doppler spread, an average delay and a delay spread;

QCL type B, its quasi co-location parameters including: a Doppler shift and a Doppler spread;

QCL type C, its quasi co-location parameters including: an average delay and a Doppler shift; and QCL type D, its quasi co-location parameter including: a spatial reception parameter.

Since problems arise in scenarios such as beam switching, BWP switching and carrier aggregation due to poor flexibility of periodic reference signals, aperiodic reference signals are introduced. Some aperiodic reference signals may be triggered by downlink control information (DCI). In a case that a network device configures an aperiodic reference signal at a certain time instant, but a terminal fails to detect the DCI configured to trigger the aperiodic reference signal, then the terminal cannot determine parameter information, such as a Doppler shift, a Doppler spread, an average delay and a delay spread, of a physical channel or physical signal for which the aperiodic reference signal is used as a QCL source reference signal, which may lead to a failure in determining a large-scale parameter of the physical channel or physical signal.

SUMMARY

In a first aspect, an embodiment of the present disclosure provides a quasi co-location configuration method. The method is applied to a terminal side and includes: in a case that a network device configures an aperiodic reference signal quasi-co-located with a physical channel or a physical signal, determining, according to a preset manner, that the aperiodic reference signal or a target physical signal associated with the aperiodic reference signal is a quasi co-location signal of the physical channel or the physical signal.

In a second aspect, an embodiment of the present disclosure provides a terminal. The terminal includes a processor, a memory and a program stored in the memory and configured to be executed by the processor, where the processor is configured to execute the program to implement steps of the quasi co-location configuration method described above.

In a third aspect, an embodiment of the present disclosure provides a non-transitory computer-readable storage medium storing therein a program, the program is configured to be executed by a processor to implement steps of the foregoing quasi co-location configuration method applied to the terminal side.

BRIEF DESCRIPTION OF THE DRAWINGS

In order to illustrate the technical solutions of the embodiments of the present disclosure in a clearer manner, the drawings required for the description of the embodiments of the present disclosure will be described hereinafter briefly. Obviously, the following drawings merely relate to some embodiments of the present disclosure, and based on these drawings, a person of ordinary skill in the art may obtain other drawings without any creative effort.

FIG. 1 is a block diagram illustrating a wireless communication system to which embodiments of the present disclosure may be applied;

FIG. 2 is a first schematic flow chart illustrating a quasi co-location configuration method applied to a terminal side according to an embodiment of the present disclosure;

DETAILED DESCRIPTION

Figure 3:
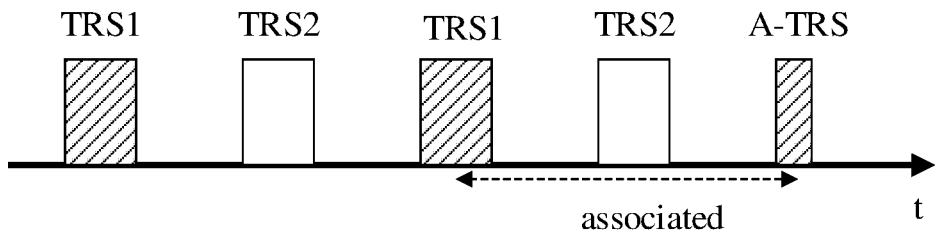
FIG. 3 is a schematic diagram of a mapping between a periodic TRS and an aperiodic TRS.

Exemplary embodiments of the present disclosure will be described hereinafter in more detail with reference to the accompanying drawings. Although exemplary embodiments of the present disclosure are shown in the drawings, it should be appreciated that the present disclosure may be implemented in various forms and should not be limited by the exemplary embodiments. On the contrary, these embodiments are provided to enable a thorough understanding of the present disclosure and to convey the scope of the present disclosure to a person skilled in the art.

Terms such as "first" and "second" in the description and claims of the present disclosure are used to differentiate similar objects, and not necessarily used to describe a specific sequence or order. It should be appreciated that the data used in this way may be interchanged under an appropriate circumstance, so that the embodiment of the present disclosure described herein, for example, may be implemented in a sequence other than those illustrated or described herein. Moreover, terms "include", "have" and any other variation thereof are intended to encompass non-exclusive inclusion, such that a process, method, system, product or device including a series of steps or units includes not only those steps or elements, but also other steps or units not explicitly listed, or steps or units inherent in the process, method, system, product or device. Phrase "and/or" in the description and claims denotes at least one of connected objects.

The technology described in the present disclosure is not limited to a long term evolution (LTE)/LTE-advanced (LTE-A) system, but also may be used in various wireless communication systems, such as a code division multiple access (CDMA), time division multiple access (TDMA), frequency division multiple access (FDMA), orthogonal frequency division multiple access (OFDMA), single-carrier frequency-division multiple access (SC-FDMA) and other systems. Terms "system" and "network" are often used interchangeably. The CDMA system may implement such radio technologies as CDMA2000 and universal terrestrial radio access (UTRA). UTRA includes wideband code division multiple access (WCDMA) and other CDMA variants. The TDMA system may implement such radio technologies as global system for mobile communication (GSM). The OFDMA system may implement such radio technologies as ultra mobile broadband (UMB), evolution-UTRA (E-UTRA), IEEE 802.11 (Wi-Fi), IEEE 802.16 (WiMAX), IEEE 802.20, Flash-OFDM. UTRA and E-UTRA are parts of universal mobile telecommunications system (UMTS). LTE and more advanced LTE (such as LTE-A) are new UMTS versions using E-UTRA. UTRA, E-UTRA, UMTS, LTE, LTE-A and GSM are described in literature from an organization called "3rd generation partnership project (3GPP)". CDMA2000 and UMB are described in literature from an organization called "3rd generation partnership project 2 (3GPP2)". The technology described herein not only may be used for the systems and radio technologies mentioned above, but also may be used for other systems and radio technologies. A new radio (NR) system is described for illustrative purpose in the following description, and NR terminologies are used in most of the following description, although these technologies may also be applied to applications other than the NR system.

The following description is merely exemplary, and is by no means limitative of the scope, applicability or configuration set forth in the claims. The function and arrangement of the elements discussed may be changed without departing from the spirit and scope of the present disclosure. Various processes or components may be omitted, replaced, or added as appropriate in various examples. For example, the described methods may be performed in a different order than described, and various steps may be added, omitted or combined. In addition, features described with reference to some examples may be combined in other examples.

Referring to FIG. 1, FIG. 1 is a block diagram illustrating a wireless communication system to which embodiments of the present disclosure may be applied. The wireless communication system includes a terminal 11 and a network device 12. The terminal 11 may also be called a terminal device or user equipment (UE), and the terminal 11 may be a terminal side device, such as a mobile phone, a tablet personal computer, a laptop computer, a personal digital assistant (PDA), a mobile internet device (MID), a wearable device or a vehicle-mounted device. It should be appreciated that, specific type of the terminal 11 is not limited in embodiments of the present disclosure. The network device 12 may be a base station or a core network. The base station may be a base station of 5G or later version (for example, a gNB, a 5g NR NB or the like), or a base station in other communication systems (e.g., an eNB, a WLAN access point, other access points or the like). The base station may be referred to as a node B, an evolved node B, an access point, a base transceiver station (BTS), a radio base station, a radio transceiver, a basic service set (BSS), an extended service set (ESS), a B node, an evolved B node (eNB), a home node B, a home evolved node B, a WLAN access point, a WiFi node or some other suitable term in the field. As long as a same technical effect is achieved, the base station is not limited to specific technical terms. It should be appreciated that, in the embodiments of this disclosure, only the base station in the NR system is taken as an example, but the specific type of the base station is not limited.

The base station may communicate with the terminal 11 under the control of a base station controller. In various examples, the base station controller may be a part of a core network or some base stations. Some base stations may communicate control information or user data with the core network via a backhaul. In some examples, some of these base stations may directly or indirectly communicate with each other via a backhaul link, which may be a wired or wireless communication link. The wireless communication system may support operations on multiple carriers (waveform signals of different frequencies). A multi-carrier transmitter may simultaneously transmit modulated signals on the multiple carriers. For example, each communication link may be a multi-carrier signal modulated according to various radio technologies. Each modulated signal may be transmitted on a different carrier and may carry control information (e.g., a reference signal, a control channel, etc.), overhead information, data, etc.

The base station may wirelessly communicate with the terminal 11 via one or more access point antennas. Each base station may provide communication coverage for its corresponding coverage area. The coverage area of an access point may be divided into sectors that each constitute only a part of the coverage area. The wireless communication system may include different types of base stations (for example, macro base stations, micro base stations or pico base stations). The base stations may also utilize different radio technologies, such as cellular or WLAN radio access technologies. The base stations may be associated with a same access network or operator deployment or associated with different access networks or operator deployments. The coverage areas of different base stations (including coverage areas of same type or different types of base stations, coverage areas using the same radio technology or different radio technologies, or coverage areas belonging to the same access network or different access networks) may overlap.

A communication link in the wireless communication system may include an uplink (UL) for carrying an uplink transmission (for example, from the terminal 11 to the network device 12), or a downlink (DL) for carrying a downlink transmission (for example, from the network device 12 to the terminal 11). The UL transmission may also be referred to as a reverse link transmission, and the DL transmission may also be referred to as a forward link transmission. The downlink transmission may be performed by using a licensed frequency band, an unlicensed frequency band, or both. Similarly, the uplink transmission may be performed by using a licensed frequency band, an unlicensed frequency band or both.

A quasi co-location configuration method applied to the terminal side is provided in an embodiment of the present disclosure. As shown in FIG. 2, the method may include the following steps.

Step 21, in a case that a network device configures an aperiodic reference signal quasi-co-located with a physical channel or a physical signal, determining, according to a preset manner, that the aperiodic reference signal or a target physical signal associated with the aperiodic reference signal is a quasi co-location signal of the physical channel or the physical signal.

The aperiodic reference signal mentioned here is a quasi co-location source reference signal (QCL source RS) configured by a network device for the physical channel or the physical signal. The aperiodic reference signal may include an aperiodic tracking reference signal (TRS) and an aperiodic channel state information reference signal (CSI-RS). The determining that the aperiodic reference signal or a target physical signal associated with the aperiodic reference signal is a quasi co-location signal of the physical channel or the physical signal refers to: determining that the aperiodic reference signal is quasi co-located with the physical channel or the physical signal, or determining that the target physical signal associated with the aperiodic reference signal is quasi co-located with the physical channel or the physical signal.

When a frequency offset, a time offset, a Doppler shift, a Doppler spread and a delay spread of a system are accurately estimated, in order to reduce overhead, it is necessary to avoid an always-on cell special reference signal (CRS). Thus, a new reference signal, i.e., tracking reference signal TRS, is introduced. A receiving end may accurately estimate channel parameters based on TRS to improve accuracy of demodulation.

In a frequency range 1, the terminal may be configured with 4 columns of TRS in two consecutive slots. In a frequency range 2, the terminal may be configured with 4 columns of TRS in two consecutive slots or 2 columns of TRS in one slot. TRS resources in the two consecutive slots or one slot may be referred to as a TRS burst. The TRS burst has a same period, bandwidth and sub-carrier position.

A frequency domain density of TRS is fixed at $\rho=3$, that is, TRS are separated from each other by 4 subcarriers in the frequency domain. A bandwidth of TRS is a smaller one of a bandwidth occupied by 50 resource blocks (RBs) and a bandwidth occupied by a bandwidth part (BWP). In addition, TRS may also be a periodic reference signal, and a period of TRS may be 10 ms, 20 ms, 40 ms or 80 ms.

Since problems arise in scenarios such as beam switching, BWP switching and carrier aggregation due to poor flexibility of periodic TRS, aperiodic TRS are introduced. In the frequency range 2, the aperiodic TRS is supported as an optional terminal capability. It should be noted that, only when the terminal is configured with an associated periodic TRS having a same burst length in a same BWP, may an aperiodic TRS be triggered for the terminal; otherwise the terminal will not expect the triggering of the aperiodic TRS. The aperiodic TRS and the associated periodic TRS have a same bandwidth, symbol position, subcarrier position and burst length, and satisfy a certain QCL relationship. Parameter information such as a Doppler shift, a Doppler spread, an average delay and a delay spread may all be estimated according to TRS. If other physical signals or physical channels are quasi-co-located with TRS, then TRS may be used as a QCL source reference signal (RS) of these physical signals or physical channels. These physical signals or physical channels may use information estimated according to TRS such as a Doppler shift, a Doppler spread, an average delay and a delay spread. As a type of TRS, the aperiodic TRS may also be used as a QCL source reference signal of the physical signal or physical channel.

Similar to TRS, CSI-RS for beam management has a function of beam indication. If other physical channels or physical signals are quasi-co-located with this type of CSI-RS, quasi co-location parameters of the CSI-RS may be used in determining large-scale parameters of the physical channels or physical signals. CSI-RS for channel state information measurement (CSI-RS for CSI) may also provide, in some scenarios, all the time, frequency and space parameters, such as an average delay, a Doppler shift, a delay spread, a Doppler spread and a spatial reception parameter. If other physical channels or physical signals are quasi-co-located with this type of CSI-RS, quasi co-location parameters of the CSI-RS may also be used in determining large-scale parameters of the physical channels or physical signals. Due to poor flexibility of a periodic CSI-RS, a concept of aperiodic CSI-RS is further introduced in the system, and both the aperiodic TRS and the aperiodic CSI-RS may be triggered by DCI. Large-scale parameters may also be referred to as large-scale properties, and include one or more of following large-scale channel properties: a delay spread, a Doppler spread, a Doppler shift, an average delay and a spatial RX parameter.

An original QCL source reference signal of the physical channel or the physical signal is the aperiodic reference signal (such as the aperiodic TRS and/or the aperiodic CSI-RS). For example, the network device configures that a physical channel or a physical signal is to be transmitted at a time instant X, and configures an aperiodic reference signal as the QCL source reference signal for the physical channel or the physical signal. When the terminal fails to detect DCI configured to trigger the aperiodic TRS, the terminal determines according to a preset manner that an aperiodic reference signal or a target physical signal associated with the aperiodic reference signal is a quasi co-location signal of the physical channel or the physical signal. That the terminal fails to detect the DCI configured to trigger the aperiodic reference signal may be that the terminal has not detected the DCI, or the terminal has detected the DCI but fails to receive the DCI correctly, i.e., fails to parse information carried by the DCI correctly.

An association relationship between the aperiodic reference signal and the target physical signal is determined according to a quasi co-location relationship indicated by a high-layer signaling transmitted by the network device. When the aperiodic reference signal is the aperiodic TRS, the target physical signal is the periodic TRS. The association relationship between the aperiodic TRS and the periodic TRS refers to that the two TRS at least meet the following condition: the aperiodic TRS and the periodic TRS have the same bandwidth, symbol position, subcarrier position and burst length, and the aperiodic TRS and the associated periodic TRS satisfy a certain QCL relationship, i.e., QCL type A+QCL type D. When the aperiodic reference signal is the aperiodic CSI-RS, the target physical signal is at least one of a periodic TRS, a aperiodic TRS, a synchronization signal and PBCH block (SSB), a periodic CSI-RS, a semi-persistent CSI-RS or an aperiodic CSI-RS. Taking SSB as an example, SSB is used for downlink time and frequency synchronization during an initial access stage. Before radio resource control (RRC), SSB may provide all the time, frequency and space parameters. After RRC, SSB may still provide time, frequency or space parameters for some channels or signals according to an indication in a signaling. In some scenarios, SSB may provide a parameter on QCL type D for the aperiodic CSI-RS.

A quasi co-location type of a quasi co-location relationship between the physical channel or the physical signal and the target physical signal is the same as a quasi co-location type of a quasi co-location relationship between the physical channel or the physical signal and the aperiodic reference signal. For example, in a case that the quasi co-location type of the quasi co-location relationship between the physical channel or the physical signal and the aperiodic reference signal is QCL type A, the quasi co-location type of the quasi co-location relationship between the physical channel or the physical signal and the target physical signal is also QCL type A. In a case that the quasi co-location type of the quasi co-location relationship between the physical channel or the physical signal and the aperiodic reference signal is QCL type D, the quasi co-location type of the quasi co-location relationship between the physical channel or the physical signal and the target physical signal is also QCL type D. In a case that the quasi co-location type of the quasi co-location relationship between the physical channel or the physical signal and the aperiodic reference signal is QCL type A+D, the quasi co-location type of the quasi co-location relationship between the physical channel or the physical signal and the target physical signal is also QCL type A+D.

The preset manner may be predefined, or indicated by a first signaling received from the network device. That the preset manner may be predefined includes, but is not limited to: the preset manner is pre-defined in a protocol, the preset manner is agreed upon between the terminal and the network device in advance, and the like. The first signaling may include, but is not limited to, a DCI signaling, a high-layer signaling (such as an RRC parameter configuration signaling), or a medium access control (MAC) layer signaling, etc.

In the following, an implementation of the above step 21 will be described in conjunction with specific application scenarios in this embodiment.

A first scenario, in a case that the aperiodic reference signal is received within a first time window, it is determined that the aperiodic reference signal is the quasi co-location signal of the physical channel or the physical signal.

In this scenario, it is assumed that the network device configures the aperiodic TRS and the aperiodic CSI-RS as a QCL source reference signal of a certain physical signal. A QCL relationship between the aperiodic TRS and the physical signal is QCL type A, and a QCL relationship between the aperiodic CSI-RS and the physical signal is QCL type D. Then in a case that the terminal receives the aperiodic TRS and the aperiodic CSI-RS within the pre-determined first time window, the terminal may directly use the aperiodic TRS and the aperiodic CSI-RS as a QCL signal of the physical signal.

One or more aperiodic reference signals may be received within the first time window. When multiple aperiodic reference signals are received, the terminal may select an aperiodic reference signal as the QCL signal of the physical channel or the physical signal according to, but not limited to, the following manner: determining that a received aperiodic reference signal closest to the physical channel or the physical signal is the quasi co-location signal of the physical channel or the physical signal.

It is noted that, in this embodiment, the above-mentioned examples are merely for illustrative purposes. The aperiodic reference signal may also include only the aperiodic TRS or aperiodic CSI-RS. For a specific manner of determining the QCL signal of the physical channel or the physical signal in these cases, reference may be made to the above examples, a detail description is not repeated herein.

A second scenario, in a case that the aperiodic reference signal is not received within the first time window, it is determined that the target physical signal associated with the aperiodic reference signal is the quasi co-location signal of the physical channel or the physical signal.

In this scenario, it is assumed that the network device configures the aperiodic TRS and the aperiodic CSI-RS as a QCL source reference signal of a certain physical signal. A QCL relationship between the aperiodic TRS and the physical signal is QCL type A, and a QCL relationship between the aperiodic CSI-RS and the physical signal is QCL type D. When the terminal fails to receive the aperiodic TRS within the pre-determined first time window, the terminal may determine that the periodic TRS associated with the aperiodic TRS is a QCL signal of the physical signal, that is, determine that the periodic TRS associated with the aperiodic TRS is a new QCL source reference signal of the physical signal. A QCL relationship between the aperiodic TRS and the periodic TRS is QCL type A+QCL type D, then a QCL relationship between the periodic TRS and the physical signal is QCL type A. Further, in a case that the terminal also fails to receive the aperiodic CSI-RS within the pre-determined first time window, the terminal may determine that the target physical signal (such as SSB) associated with the aperiodic CSI-RS is the QCL signal of the physical signal, that is, the terminal may use the SSB associated with the aperiodic CSI-RS as a new QCL source reference signal of the physical signal. A QCL relationship between the aperiodic CSI-RS and the SSB is QCL type C+QCL type D, then a QCL relationship between the SSB and the physical signal is QCL type D.

In addition, when the aperiodic reference signal only includes the aperiodic TRS, a target TRS that may be used to replace the aperiodic TRS may include, but is not limited to, at least one of the following types.

Type 1, a periodic TRS associated with the aperiodic TRS. The association mentioned here may refer to that: the periodic TRS and the aperiodic TRS have a same bandwidth, symbol position, subcarrier position and burst length, and satisfy a certain quasi co-location relationship, e.g., at least one of QCL type A, QCL type B, QCL type C or QCL type D. In other words, the target TRS is a periodic TRS having a same bandwidth, symbol position, subcarrier position and burst length as the aperiodic TRS, and satisfying a certain quasi co-location relationship (such as QCL type A+QCL type D) with the aperiodic TRS.

That is, in a case that the terminal fails to detect the downlink control information DCI configured to trigger the aperiodic tracking reference signal TRS, the terminal determines that the periodic TRS associated with the aperiodic TRS is a new quasi co-location QCL source reference signal of the physical channel or the physical signal.

Type 2, an aperiodic TRS last received in a preset time window before the physical channel or physical signal transmission. The preset time window mentioned here may also be referred to as a search window or some other appropriate term in the field, which is not specifically limited in this embodiment. The aperiodic TRS last received in the preset time window mentioned here may refer to one of the aperiodic TRS received by the terminal within the preset time window that is closest to the physical channel or the physical signal. For example, assuming that the terminal receives an A-TRS1, an A-TRS2 and an A-TRS3 within the preset time window, and the A-TRS3 is closest to the physical channel or the physical signal, it is determined that the A-TRS3 is the target TRS.

In other words, the terminal may determine that an aperiodic TRS that is received within the preset time window and is closest to the physical channel or the physical signal is a new QCL source reference signal of the physical channel or the physical signal.

Type 3, a TRS last received within the preset time window. The TRS last received within the preset time window mentioned here refers to one of the aperiodic TRS (A-TRS) and a periodic TRS associated with the A-TRS received by the terminal within the preset time window that is closest to the physical channel or the physical signal. For example, assuming that the terminal receives an A-TRS and a P-TRS (periodic TRS) within the preset time window, if the P-TRS is closest to the physical channel or the physical signal, it is determined that the P-TRS is the target TRS.

That is, the terminal may determine that a TRS that is received within the preset time window and is closest to the physical channel or the physical signal is a new QCL source reference signal of the physical channel or the physical signal.

It should be noted that, the preset manner is used to indicate which type of target TRS is used by the terminal. For example, the preset manner indicates that the terminal may only use the target TRS of type 1, then the terminal may only determine that the periodic TRS associated with the aperiodic TRS is the new quasi co-location QCL source reference signal of the physical channel or the physical signal in a case that the terminal fails to detect the downlink control information DCI configured to trigger the aperiodic tracking reference signal TRS. Or, the preset manner indicates that the terminal may only use the target TRS of type 2, then the terminal may only determine that the aperiodic TRS that is received within the preset time window and is closest to the physical channel or the physical signal is the new quasi co-location QCL source reference signal of the physical channel or the physical signal. Or, the preset manner indicates that the terminal may only use the target TRS of type 3, then the terminal may only determine that the TRS that is received within the preset time window and is closest to the physical channel or the physical signal is the new quasi co-location QCL source reference signal of the physical channel or the physical signal.

In addition, the network device configures the aperiodic CSI-RS as a QCL source reference signal of a certain physical signal. A QCL relationship between the aperiodic CSI-RS and the physical signal is QCL type A+D. When the terminal fails to receive the aperiodic CSI-RS within the pre-determined first time window, the terminal may use the target physical signal associated with the aperiodic CSI-RS as a new QCL source reference signal of the physical signal. In a case that the associated target physical signal includes the TRS and the SSB, and if a QCL relationship between the TRS and the aperiodic CSI-RS is QCL type A, then a QCL relationship between the SSB and the aperiodic CSI-RS is QCL type D.

Further, the network device configures the aperiodic CSI-RS as a QCL source reference signal of a certain physical signal. A QCL relationship between the aperiodic CSI-RS and the physical signal is QCL type A+D. When the terminal fails to receive the aperiodic CSI-RS in the pre-determined first time window, the terminal may use a first target physical signal received in a second time window and associated with the aperiodic CSI-RS as a new QCL source reference signal of the physical signal. In a case that the terminal fails to receive the first target physical signal associated with the aperiodic CSI-RS within the second time window, the terminal determines in a preset manner that the second target physical signal associated with the first target physical signal is a quasi co-location signal of the physical channel or the physical signal. Taking that the first target physical signal is the aperiodic TRS as an example, when the terminal fails to receive the aperiodic CSI-RS within the predetermined first time window, the terminal may use the aperiodic TRS received in the second time window and associated with the aperiodic CSI-RS as a new QCL source reference signal of the physical signal. If the terminal fails to receive the aperiodic TRS associated with the aperiodic CSI-RS within the second time window, the terminal determines that the periodic TRS associated with the aperiodic TRS is the quasi co-located signal of the physical channel or the physical signal. A QCL relationship between the aperiodic TRS and the periodic TRS is QCL type A+QCL type D, and a QCL relationship between the aperiodic TRS and the aperiodic CSI-RS is QCL type A, then a QCL relationship between the periodic TRS and the physical signal is QCL type A.

A first time window corresponding to the aperiodic TRS may be different from a first time window corresponding to the aperiodic CSI-RS. Parameters of the first time window include, but are not limited to, at least one of a window length (a duration of the window), a start position of the window or an end position of the window. For example, parameters of the preset time window only include the window length or the start position of the window, then the end position of the window is a default position, i.e., a time domain start position of a resource corresponding to the physical channel or the physical signal. For example, the window length is Y, the time domain start position of the resource corresponding to the physical channel or the physical signal is X, then the start position of the window is X-Y. The window length of the first time window is a period length of a periodic signal associated with the aperiodic reference signal. For example, a window length of the first time window corresponding to the aperiodic TRS may be a period length of the periodic TRS associated with the aperiodic TRS. For another example, a window length of the first time window corresponding to the aperiodic CSI-RS may be a period length of the SSB, the periodic TRS or the periodic CSI-RS associated with the aperiodic CSI-RS. Assuming that the aperiodic CSI-RS and the periodic TRS is associated according to QCL type A, and the aperiodic CSI-RS and SSB is associated according to QCL type D, then the window length of the first time window corresponding to the aperiodic CSI-RS may be selected from period lengths of these two periodic signals.

The parameters of the first time window may be predefined, or may be indicated by a second signaling received from the network device. That the parameters of the first time window may be predefined includes, but is not limited to: the parameters of the first time window are pre-determined in a protocol, the parameters of the first time window are agreed upon between the terminal and the network device in advance and the like. The second signaling may include, but is not limited to: a DCI signaling, a high-layer signaling (such as a RRC parameter configuration signaling), or a medium access control MAC layer signaling, etc. The second time window is similar to the first time window, and for the parameter type and parameter configuration manner of the second time window, reference may be made to the embodiment of the first time window, thus a detailed description is not repeated herein.

A third scenario, in a case that the aperiodic reference signal and the target physical signal associated with the aperiodic reference signal are received within the first time window, it is determined that one, closest to the physical channel or the physical signal, of the aperiodic reference signal and the target physical signal is the quasi co-location signal of the physical channel or the physical signal. For example, the terminal receives an aperiodic TRS1, an aperiodic TRS2 and an aperiodic TRS3 within the first time window, wherein the aperiodic TRS3 is closest to the physical channel or the physical signal, then the terminal determines that the aperiodic TRS3 is the QCL signal of the physical signal.

Figure 4:
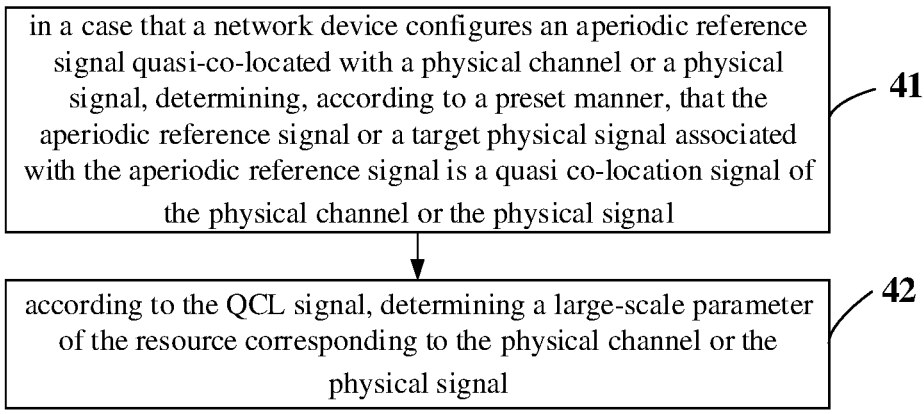
FIG. 4 is a second schematic flow chart illustrating a quasi co-location configuration method applied to a terminal side according to an embodiment of the present disclosure.

As shown in FIG. 4, the method in the embodiment of the present disclosure may further include a step 41 and a step 42.

The step 41 is the same as the step 21, thus a detailed description is not repeated.

The step 42 includes: according to the QCL signal, determining a large-scale parameter of the resource corresponding to the physical channel or the physical signal.

In order to determine the large-scale parameter of the resource corresponding to the physical channel or the physical signal, the terminal determines in a preset manner that the configured aperiodic reference signal or target physical signal is a new QCL source reference signal of the physical channel or the physical signal. After the new QCL source reference signal is determined, a large-scale estimation parameter is provided through the new QCL source reference signal to ensure the normal transmission of the physical channel or the physical signal.

In addition, the physical channel includes, but is not limited to, at least one of a physical downlink shared channel (PDSCH) or a physical downlink control channel (PDCCH). The physical signal includes, but is not limited to, at least one of a de-modulation reference signal (DMRS), a channel state information reference signal (CSI-RS) or other types of reference signals.

It should be appreciated that, the aperiodic reference signal and the target physical signal involved in the embodiments of the present disclosure may be on different carriers or in different cells, or the aperiodic reference signal and the target physical signal involved in the embodiments of the present disclosure may be on a same carrier or in a same cell. For example, when a secondary cell (SCell) is activated, if the periodic TRS is still configured for SCell time-frequency tracking, after the MAC CE signaling takes effect, time-frequency tracking cannot be performed on a SCell downlink channel until a next TRS period (the delay may be up to one TRS period), and the terminal cannot achieve fine synchronization with the SCell until the TRS is received, resulting in a waste of resources. The aperiodic TRS is triggered by the DCI, so the terminal may receive the aperiodic TRS in time to perform the time-frequency tracking on the SCell, without having to wait for the next period as in the case of the periodic TRS. The aperiodic TRS is associated with a certain periodic TRS, and they have a QCL relationship of QCL type A+D. The aperiodic TRS is in an SCell, but the periodic TRS associated therewith may be in a primary cell (PCell), in this case, the aperiodic TRS and the associated periodic TRS are on different carriers or in different cells.

In the quasi co-location configuration method according to the embodiment of the present disclosure, in a case that the network device configures the aperiodic reference signal for the physical channel or the physical signal, the terminal may determine a quasi co-location parameter of the physical channel or the physical signal in accordance with the aperiodic reference signal or the target physical signal associated with the aperiodic reference signal, such that it is ensured that the large-scale parameter corresponding to the physical channel or the physical signal may be acquired, thereby ensuring the normal transmission of the physical channel or the physical signal.

The quasi co-location configuration method in different scenarios is described in the above embodiments, and the corresponding terminal will be further described with reference to the accompanying drawings.

Figure 5:
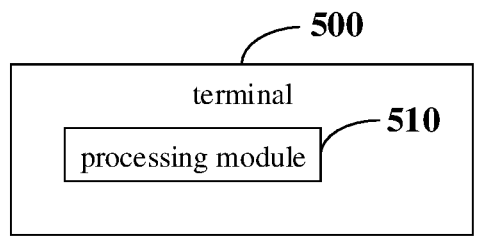
FIG. 5 is a schematic diagram of modular structure of a terminal according to an embodiment of the present disclosure.

As shown in FIG. 5, a terminal 500 according to the embodiment of the present disclosure may implement details of the method in the foregoing embodiment that: in a case that a network device is configured with an aperiodic reference signal quasi-co-located with a physical channel or a physical signal, determining, according to a preset manner, that the aperiodic reference signal or a target physical signal associated with the aperiodic reference signal is a quasi co-location signal of the physical channel or the physical signal, and may achieve the same effects. The terminal 500 specifically includes the following functional module:

a processing module 510, configured to, in a case that a network device configures an aperiodic reference signal quasi-co-located with a physical channel or a physical signal, determine, according to a preset manner, that the aperiodic reference signal or a target physical signal associated with the aperiodic reference signal is a quasi co-location signal of the physical channel or the physical signal.

An association relationship between the aperiodic reference signal and the target physical signal is determined according to a quasi co-location relationship indicated by a high-layer signaling transmitted by the network device.

A quasi co-location type of a quasi co-location relationship between the physical channel or the physical signal and the target physical signal is the same as a quasi co-location type of a quasi co-location relationship between the physical channel or the physical signal and the aperiodic reference signal.

The processing module 510 includes: a first processing sub-module, configured to, in a case that the aperiodic reference signal is received within a first time window, determine that the aperiodic reference signal is the quasi co-location signal of the physical channel or the physical signal; or a second processing sub-module, configured to, in a case that the aperiodic reference signal is not received within the first time window, determine that the target physical signal associated with the aperiodic reference signal is the quasi co-location signal of the physical channel or the physical signal; or a third processing sub-module, configured to, in a case that the aperiodic reference signal and the target physical signal associated with the aperiodic reference signal are received within the first time window, determine that one, closest to the physical channel or the physical signal, of the aperiodic reference signal and the target physical signal is the quasi co-location signal of the physical channel or the physical signal.

The processing module 510 further includes: a fourth processing sub-module, configured to determine that a received aperiodic reference signal closest to the physical channel or the physical signal is the quasi co-location signal of the physical channel or the physical signal.

The preset manner is predefined or indicated by a first signaling received from the network device.

The first signaling includes: a DCI signaling, a high-layer signaling, or a medium access control MAC layer signaling.

A parameter of the first time window is predefined or indicated by a second signaling received from the network device.

The second signaling includes: a DCI signaling, a high-layer signaling or a medium access control MAC layer signaling.

The parameter of the first time window includes at least one of a window length, a start position or an end position, and the window length is a period length of a periodic signal associated with the aperiodic reference signal.

The aperiodic reference signal includes: at least one of an aperiodic tracking reference signal TRS or an aperiodic channel state information reference signal CSI-RS.

In a case that the aperiodic reference signal is the aperiodic TRS, the target physical signal is a periodic TRS. In a case that the aperiodic reference signal is the aperiodic CSI-RS, the target physical signal is at least one of a periodic TRS, an aperiodic TRS, a synchronization signal and PBCH block SSB, a periodic CSI-RS, a semi-persistent CSI-RS or an aperiodic CSI-RS.

The processing module 510 further includes: a fifth processing sub-module, configured to, when the aperiodic reference signal is the aperiodic CSI-RS and in a case that a first target physical signal associated with the aperiodic CSI-RS is not received within a second time window, determine, according to the preset manner, that a second target physical signal associated with the first target physical signal is the quasi co-location signal of the physical channel or the physical signal.

The aperiodic reference signal and the target physical signal are on different carriers or in different cells, or the aperiodic reference signal and the target physical signal are on a same carrier or in a same cell.

The physical channel includes at least one of a physical downlink shared channel PDSCH or a physical downlink control channel PDCCH, and the physical signal includes at least one of a demodulation reference signal DMRS or a channel state information reference signal CSI-RS.

It should be noted that, in a case that the DCI configured to trigger the aperiodic TRS is lost, the terminal in the embodiment of the present disclosure instead uses the target TRS as the new QCL source reference signal of the physical channel or the physical signal, which may ensure the normal transmission of the physical channel or the physical signal.

Figure 6:
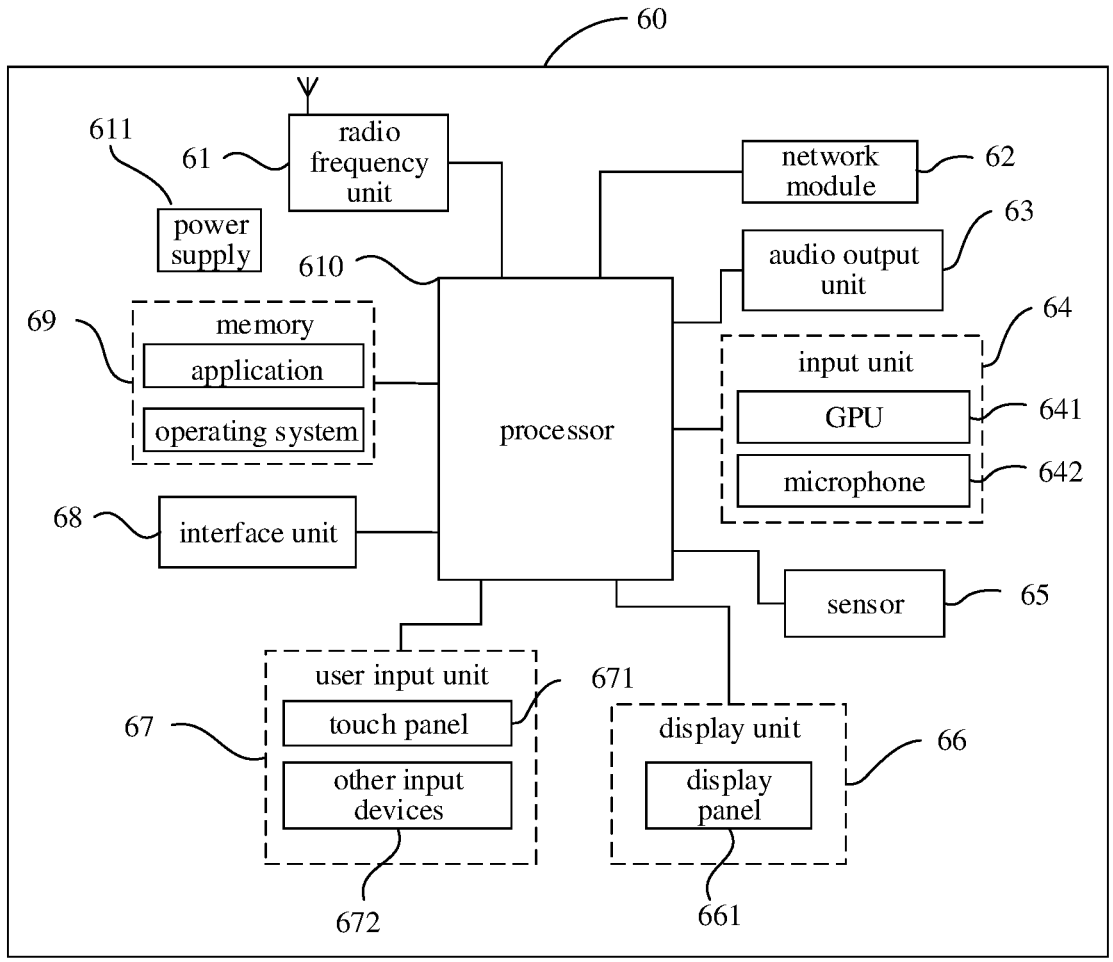
FIG. 6 is a block diagram of a terminal according to an embodiment of the present disclosure.

In order to better achieve the foregoing objectives, further, FIG. 6 is a schematic diagram of a hardware structure of a terminal in which various embodiments of the present disclosure may be implemented. The terminal 60 includes, but is not limited to: a radio frequency unit 61, a network module 62, an audio output unit 63, an input unit 64, a sensor 65, a display unit 66, a user input unit 67, an interface unit 68, a memory 69, a processor 610, a power supply 611 and other components. A person skilled in the art may understand that, the terminal structure shown in FIG. 6 does not constitute a limitation on the terminal, and the terminal may include more or fewer components than those shown in the figure, or some components may be combined, or the components may have a different layout. In the embodiments of the present disclosure, the terminal includes, but is not limited to, a mobile phone, a tablet computer, a notebook computer, a palmtop computer, a vehicle-mounted terminal, a wearable device, a pedometer, etc.

The radio frequency unit 61 is configured to transmit and receive data under the control of the processor 610.

The processor 610 is configured to, in a case that a network device configures an aperiodic reference signal quasi-co-located with a physical channel or a physical signal, determine according to a preset manner that the aperiodic reference signal or a target physical signal associated with the aperiodic reference signal is a quasi co-location signal of the physical channel or the physical signal.

In a case that the network device configures the aperiodic reference signal for the physical channel or the physical signal, the terminal in the embodiment of the present disclosure may determine a quasi co-location parameter of the physical channel or the physical signal in accordance with the aperiodic reference signal or the target physical signal associated with the aperiodic reference signal, such that it is ensured that the large-scale parameter of the physical channel or the physical signal is determined, thereby ensuring the normal transmission of the physical channel or the physical signal.

It should be appreciated that, in the embodiment of the present disclosure, the radio frequency unit 61 may be configured to receive and transmit signals during information transmission or during a call. Specifically, the radio frequency unit 61 receives downlink data from a base station, and transfers the downlink data to the processor 610 for processing; and additionally the radio frequency unit 61 sends uplink data to the base station. Generally, the radio frequency unit 61 includes, but is not limited to, an antenna, at least one amplifier, a transceiver, a coupler, a low noise amplifier, a duplexer, and the like. In addition, the radio frequency unit 61 may also communicate with a network and other devices through a wireless communication system.

The terminal provides a user with wireless broadband Internet access through the network module 62, e.g., helps the user send and receive emails, browse web pages, and access streamed media, etc.

The audio output unit 63 may convert audio data received by the radio frequency unit 61 or the network module 62 or stored in the memory 69 into an audio signal and output the audio signal as sound. Moreover, the audio output unit 63 may also provide audio output related to a specific function performed by the terminal 60 (e.g., a calling signal reception sound, a message reception sound, etc.). The audio output unit 63 includes a speaker, a buzzer, a telephone receiver, etc.

The input unit 64 is configured to receive an audio or video signal. The input unit 64 may include a graphics processing unit (GPU) 641 and a microphone 642. The graphics processor 641 is configured to process image data of a still picture or a video acquired by an image capture device (such as a camera) in a video capturing mode or an image capturing mode. Processed image frame may be displayed on the display unit 66. The image frame processed by the graphics processing unit 641 may be stored in the memory 69 (or other storage medium) or transmitted via the radio frequency unit 61 or the network module 62. The microphone 642 may receive sound, and be able to process such sound into audio data. The processed audio data may be converted, in a case of a telephone call mode, into a format suitable for transmission to a mobile communication base station via the radio frequency unit 61 and output.

The terminal 60 further includes at least one sensor 65, for example, an optical sensor, a motion sensor, among others. In specific, the optical sensor includes ambient light sensor and proximity sensor. The ambient light sensor may adjust a brightness of a display panel 661 according to the ambient light conditions. The proximity sensor may deactivate the display panel 661 and/or a backlight when the terminal 60 is moved close to an ear. As a kind of motion sensor, an acceleration sensor may detect a magnitude of acceleration on each direction (generally, on three axes). While remaining still, the acceleration sensor may detect the magnitude and direction of gravity, which may be used in posture identification of the terminal (e.g., switch between portrait and landscape modes, related games, magnetometer posture calibration), vibration identification related function (e.g., pedometer, knock) and the like; the sensor 65 may further include a fingerprint sensor, a pressure sensor, an iris sensor, a molecule sensor, a gyroscope, a barometer, a hygrometer, a thermometer, an infrared sensor and the like, which is not described in detail herein.

The display unit 66 is configured to display information input by or presented to a user. The display unit 66 may include a display panel 661. The display panel 661 may be constructed in form of liquid crystal display (LCD), organic light-emitting diode (OLED) and the like.

The user input unit 67 may be configured to receive input numerical information or character information, and generate key signal inputs related to the user setting and function control of the terminal. In specific, the user input unit 67 includes a touch panel 671 and other input devices 672. The touch panel 671, also known as touch screen, may detect the touches thereon or in the vicinity thereof performed by the user (such as touch operations performed on or in the vicinity of the touch panel 671 by the user using a finger, stylus or any other suitable object or accessory). The touch panel 671 may include a touch detector and a touch controller. Wherein, the touch detector detects the position where the user touched and the signal resulting from the touch operation, and conveys the signal to the touch controller; the touch controller receives the touch information from the touch detector, converts the information into coordinates of the touch and conveys the coordinates to the processor 610, as well as receives and executes the commands from the processor 610. Further, the touch panel 671 may be implemented in a variety of modes, such as resistance, capacitance, infrared and surface acoustic wave. In addition to the touch panel 671, the user input unit 67 may include other input devices 672. In specific, the other input devices 672 may include, but is not limited to: physical keyboard, functional keys (such as volume control button, switch button, etc.), track ball, mouse, joystick, which is not described in detail herein.

Further, the touch panel 671 may overlie the display panel 661. Having detected a touch operation thereon or in the vicinity thereof, the touch panel 671 conveys the detected touch signal to the processor 610 to categorize the touch event, and the processor 610 provides corresponding visual output on the display panel 661 in accordance with the category of the touch event. Although, in FIG. 6, the touch panel 671 and the display panel 661 are provided as two separate parts to implement the input and output function of the terminal, the touch panel 671 and the display panel 661 may be integrated to implement the input and output function of the terminal in some embodiments, which is not limited herein.

The interface unit 68 is an interface by which an external device is connected to the terminal 60. For example, the external device may include a wired or wireless headset port, an external power supply (or battery charger) port, a wired or wireless data port, a storage card port, a port configured to be connected to a device having an identification module, an audio input/output (I/O) port, a video I/O port, an earphone port and the like. The interface unit 68 may be configured to receive input (e.g., data information, power, etc.) from the external device and transfer the received input to one or more components in the terminal 60, or may be configured to transmit data between the terminal 60 and the external device.

The memory 69 may be configured to store software program and other data. The memory 69 may include generally a program storage area and a data storage area. The program storage area may store an operating system, an application required for at least one function (such as an audio playing function and an image playback function) and the like; the data storage area may store data (e.g., audio data, phone book, etc.) created according to usage of a mobile phone, and the like. Moreover, the memory 69 may include a cache, as well as a non-volatile storage, such as at least one disk storage device, flash memory or other non-volatile solid-state storage devices.

The processor 610 is a control center of the terminal. The processor 610 is connected to various parts of the entire terminal through various interfaces and lines, and performs various functions of the terminal and processes data by executing or running software programs and/or modules stored in the memory 69 and invoking data stored in the memory 69, so as to achieve an overall monitoring of the terminal. The processor 610 may include one or more processing units; optionally, the processor 610 may integrate an application processor and a modem, wherein the application processor is mainly responsible for executing an operating system, a user interface, an application, etc., while the modem is mainly responsible for handling wireless communication. It is understood, the modem may be not integrated in the processor 610.

The terminal 60 may further include a power supply 611 (e.g., a battery) providing power to various components. Optionally, the power supply 611 may be logically connected to the processor 610 via a power management system, such that functions such as charging management, discharging management and power management may be achieved through the power management system.

Further, the terminal 60 includes some functional modules not shown in the figure, which are not described herein.

Optionally, a terminal is further provided in an embodiment of the present disclosure. The terminal includes a processor 610, a memory 69, and a program stored in the memory 69 and configured to be executed by the processor 610, wherein the processor 610 is configured to execute the program to implement various processes of the embodiments of the foregoing quasi co-location configuration method, and the same technical effect may be achieved. In order to avoid repetition, details thereof are not repeated herein. The terminal may be a wireless terminal or a wired terminal. The wireless terminal may be a device that provides voice and/or other service data connectivity to the user, a handheld device having a wireless connection function, or other processing device connected to a wireless modem. The wireless terminal may communicate with one or more core networks via a radio access network (RAN). The wireless terminal may be a mobile terminal, such as a mobile phone (or called "cellular" phone) and a computer having a mobile terminal, such as a portable, pocket-sized, handheld, computer built-in or vehicle-mounted mobile device, which exchange voice and/or data with the wireless access network. For example, the wireless terminal may be a personal communication service (PCS) phone, a cordless phone, a session initiation protocol (SIP) phone, a wireless local loop (WLL) station, a personal digital assistant (PDA) and other devices. The wireless terminal may also be referred to as a system, a subscriber unit, a subscriber station, a mobile station, a mobile, a remote station, a remote terminal, an access terminal, a user terminal, a user agent, a user device or user equipment, which is not limited herein.

A computer readable storage medium storing therein a program is further provided in an embodiment of the present disclosure, wherein the program is configured to be executed by a processor to implement various processes of the embodiments of the foregoing quasi co-location configuration method, and the same technical effect may be achieved. To avoid repetition, description thereof is not repeated herein. The computer readable storage medium is such as a read-only memory (ROM), a random access memory (RAM), a magnetic disk, or an optical disc.

The above embodiments describe the quasi co-location configuration method from the perspective of the terminal side. A quasi co-location configuration method on the network device side will be further described in the following embodiment with reference to the accompanying drawings.

Figure 7:
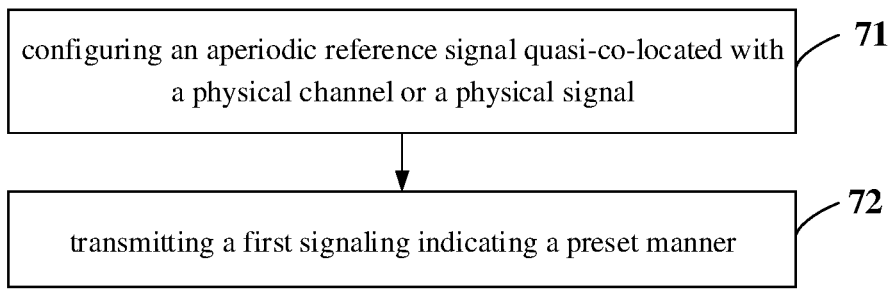
FIG. 7 is a first schematic flow chart illustrating a quasi co-location configuration method applied to a network device side according to an embodiment of the present disclosure.

As shown in FIG. 7, the quasi co-location configuration method according to the embodiment of the present disclosure is applied to the network device side and includes the following steps 71 and 72.

Step 71, configuring an aperiodic reference signal quasi-co-located with a physical channel or a physical signal.

The network device configures that a channel or a signal is to be transmitted at a time instant X, and configures an aperiodic reference signal as a QCL source reference signal for the channel or the signal, then the aperiodic reference signal is an original quasi-co-location QCL source reference signal of the physical channel or the physical signal.

Step 72, transmitting a first signaling indicating a preset manner.

Although the network device configures for the terminal DCI configured to trigger the aperiodic reference signal, it is possible that the terminal cannot receive the DCI correctly due to network performance or other reasons. In order to avoid a transmission failure of physical channel or physical signal caused by the failure in receiving the DCI by the terminal, the network device transmits the first signaling indicating the preset manner to the terminal, and the terminal determines, according to the preset manner indicated by the first signaling, that the aperiodic reference signal or a target physical signal associated with the aperiodic reference signal is a quasi co-location signal of the physical channel or the physical signal.

The aperiodic reference signal includes at least one of an aperiodic tracking reference signal TRS or an aperiodic channel state information reference signal CSI-RS. When the aperiodic reference signal is the aperiodic TRS, the target physical signal is a periodic TRS. When the aperiodic reference signal is the aperiodic CSI-RS, the target physical signal is at least one of a periodic TRS, an aperiodic TRS, a synchronization signal and PBCH block SSB, a periodic CSI-RS, a semi-persistent CSI-RS or an aperiodic CSI-RS.

The first signaling may include, but is not limited to, a DCI signaling, a high-layer signaling (such as a RRC parameter configuration signaling), or a medium access control MAC layer signaling.

It should be noted that, there is no strict chronological order between step 71 and step 72. Step 71 may be prior to step 72, or step 72 may be prior to step 71, which is not specifically limited in the embodiment of the present disclosure.

The method further includes: configuring an association relationship between the aperiodic reference signal and the target physical signal through a quasi co-location relationship in a high-layer signaling. That is, the association relationship between the aperiodic reference signal and the target physical signal is determined according to the quasi co-location relationship indicated by the high-layer signaling transmitted by the network device. When the aperiodic reference signal is the aperiodic TRS, the target physical signal is the periodic TRS.

A quasi co-location type of a quasi co-location relationship between the physical channel or the physical signal and the target physical signal is the same as a quasi co-location type of a quasi co-location relationship between the physical channel or the physical signal and the aperiodic reference signal. For example, when the quasi co-location type of a quasi co-location relationship between the physical channel or the physical signal and the aperiodic reference signal is QCL type A, the quasi co-location type of a quasi co-location relationship between the physical channel or the physical signal and the target physical signal is also QCL type A. In other words, the quasi co-location relationship between the aperiodic reference signal and the target physical signal satisfies at least quasi co-location type A.

The preset manner is such that following step is performed by the terminal:

in a case that the aperiodic reference signal is received within a first time window, determining that the aperiodic reference signal is the quasi co-location signal of the physical channel or the physical signal; the step corresponds to the above first scenario, all embodiments of the above first scenario are applicable here, therefore a detailed description is not repeated herein;

or, in a case that the aperiodic reference signal is not received within the first time window, determining that the target physical signal associated with the aperiodic reference signal is the quasi co-location signal of the physical channel or the physical signal; the step corresponds to the above second scenario, all embodiments of the above second scenario are applicable here, therefore a detailed description is not repeated herein; it should be particularly noted that, in the scenario, in a case that the aperiodic reference signal is the aperiodic CSI-RS, the preset manner is further configured to indicate to the terminal that, in a case that a first target physical signal associated with the aperiodic CSI-RS is not received within a second time window, the terminal should determine according to the preset manner that a second target physical signal associated with the first target physical signal is the quasi co-location signal of the physical channel or the physical signal;

or, in a case that the aperiodic reference signal and the target physical signal associated with the aperiodic reference signal are received within the first time window, determining that one, closest to the physical channel or the physical signal, of the aperiodic reference signal and the target physical signal is the quasi co-location signal of the physical channel or the physical signal; the step corresponds to the above third scenario, all embodiments of the above third scenario are applicable here, therefore a detailed description is not repeated herein.

Parameters of the first time window include at least one of a window length (a duration of the window), a start position of the window or an end position of the window. The window length is a period length of a periodic signal associated with the aperiodic reference signal. The parameters of the first time window may be predefined or configured by the network device. A configuration process may be implemented with reference to the following manner: transmitting a second signaling for indicating the parameters of the first time window. The second signaling includes: a DCI signaling, a high-layer signaling or a medium access control MAC layer signaling.

In addition, the physical channel includes, but is not limited to, at least one of a physical downlink shared channel PDSCH or a physical downlink control channel PDCCH. A control resource set is a set of transmission resources for at least one physical downlink control channel PDCCH. The physical signal includes, but is not limited to, at least one of a demodulation reference signal DMRS, a channel state information reference signal CSI-RS or other types of reference signals. The aperiodic reference signal and the target physical signal involved in the embodiments of the present disclosure may be on different carriers or in different cells, or the aperiodic reference signal and the target physical signal involved in the embodiments of the present disclosure may be on a same carrier or in a same cell.

In the quasi co-location configuration methods of the embodiments of the present disclosure, the network device configures the aperiodic reference signal for the physical channel or the physical signal, the terminal may determine a quasi co-location parameter of the physical channel or the physical signal in accordance with the aperiodic reference signal or the target physical signal associated with the aperiodic reference signal, such that it is ensured that the large-scale parameter corresponding to the physical channel or the physical signal may be acquired, thereby ensuring the normal transmission of the physical channel or the physical signal.

The quasi co-location configuration method in different scenarios is described in the above embodiments, and the corresponding network device will be further described in the following embodiment with reference to the accompanying drawings.

Figure 8:
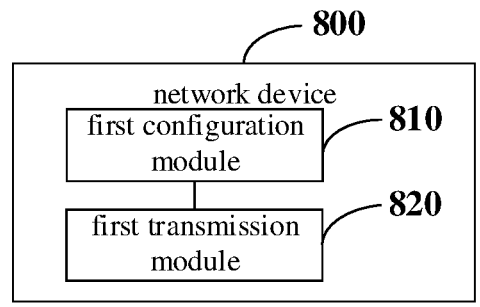
FIG. 8 is a schematic diagram of modular structure of a network device according to an embodiment of the present disclosure.

As shown in FIG. 8, a network device 800 in the embodiment of the present disclosure may implement details of the method in the foregoing embodiment that: configuring an aperiodic reference signal quasi-co-located with a physical channel or a physical signal; and transmitting a first signaling indicating a preset manner, and may achieve the same effects. The terminal determines, according to the preset manner indicated by the first signaling, that the aperiodic reference signal or a target physical signal associated with the aperiodic reference signal is a quasi co-location signal of the physical channel or the physical signal. The network device 800 specifically includes the following functional modules:

a first configuration module 810, configured to configure an aperiodic reference signal quasi-co-located with a physical channel or a physical signal;

a first transmission module 820, configured to transmit a first signaling indicating a preset manner; wherein it is determined, by a terminal according to the preset manner indicated by the first signaling, that the aperiodic reference signal or a target physical signal associated with the aperiodic reference signal is a quasi co-location signal of the physical channel or the physical signal.

The network device 800 further includes a second configuration module, configured to configure an association relationship between the aperiodic reference signal and the target physical signal according to a quasi co-location relationship in a high-layer signaling.

A quasi co-location type of a quasi co-location relationship between the physical channel or the physical signal and the target physical signal is the same as a quasi co-location type of a quasi co-location relationship between the physical channel or the physical signal and the aperiodic reference signal.

The preset manner is such that following step is performed by the terminal: in a case that the aperiodic reference signal is received within a first time window, determining that the aperiodic reference signal is the quasi co-location signal of the physical channel or the physical signal; or in a case that the aperiodic reference signal is not received within the first time window, determining that the target physical signal associated with the aperiodic reference signal is the quasi co-location signal of the physical channel or the physical signal; or in a case that the aperiodic reference signal and the target physical signal associated with the aperiodic reference signal are received within the first time window, determining that one, closest to the physical channel or the physical signal, of the aperiodic reference signal and the target physical signal is the quasi co-location signal of the physical channel or the physical signal.

The first signaling includes: a DCI signaling, a high-layer signaling, or a medium access control MAC layer signaling.

The network device 800 further includes: a second transmission module, configured to transmit a second signaling indicating a parameter of the first time window.

The second signaling includes: a DCI signaling, a high-layer signaling or a medium access control MAC layer signaling.

The parameter of the first time window includes at least one of a window length, a start position or an end position, and the window length is a period length of a periodic signal associated with the aperiodic reference signal.

The aperiodic reference signal includes: at least one of an aperiodic tracking reference signal TRS or an aperiodic channel state information reference signal CSI-RS.

In a case that the aperiodic reference signal is the aperiodic TRS, the target physical signal is a periodic TRS. In a case that the aperiodic reference signal is the aperiodic CSI-RS, the target physical signal is at least one of a periodic TRS, an aperiodic TRS, a synchronization signal and PBCH block SSB, a periodic CSI-RS, a semi-persistent CSI-RS or an aperiodic CSI-RS.

The aperiodic reference signal and the target physical signal are on different carriers or in different cells, or the aperiodic reference signal and the target physical signal are on a same carrier or in a same cell.

The physical channel includes at least one of a physical downlink shared channel PDSCH or a physical downlink control channel PDCCH, and the physical signal includes at least one of a demodulation reference signal DMRS or a channel state information reference signal CSI-RS.

It should be noted, it is understood that division of various modules of the above network device and the terminal is only a division of logical functions, and the modules may be entirely or partially integrated into a physical entity in practical implementation, or may be physically separated. And all these modules may be implemented in the form of software invoked by a processing element, or in the form of hardware. Or, some modules may be implemented in the form of software invoked by the processing element, and some modules may be implemented in the form of hardware. For example, a determining module may be a separately arranged processing element, or it may be integrated into a certain chip of the above-mentioned device. In addition, it may also be stored in the memory of the above-mentioned device in the form of program codes, which are invoked by a certain processing element of the above-mentioned device to perform function of the determining module. The implementation of other modules is similar. In addition, all or part of these modules may be integrated together or implemented independently. The processing element described here may be an integrated circuit with signal processing capability. In an implementation process, each step of the above method or each of the above modules may be implemented by hardware integrated logic circuits in the processor element or instructions in the form of software.

For example, the above modules may be one or more integrated circuits configured to implement the above methods, such as one or more application specific integrated circuits (ASICs), or one or more digital signal processors (DSPs), or, one or more field programmable gate arrays (FPGAs). For another example, when one of the above modules is implemented in the form of program codes scheduled by the processing element, the processing element may be a general-purpose processor, such as a central processing unit (CPU) or other processors capable of invoking program codes. For another example, these modules may be integrated together and implemented in the form of a system-on-a-chip (SOC).

It should be noted that, according to the embodiments of the present disclosure, the network device configures the aperiodic reference signal for the physical channel or the physical signal, and the terminal may determine a quasi co-location parameter of the physical channel or the physical signal in accordance with the aperiodic reference signal or the target physical signal associated with the aperiodic reference signal, such that it is ensured that the large-scale parameter of the physical channel or the physical signal is determined, thereby ensuring the normal transmission of the physical channel or the physical signal.

In order to better achieve the above objectives, a network device is further provided in an embodiment of the present disclosure. The network device includes a processor, a memory and a program stored in the memory and configured to be executed by the processor, wherein the processor is configured to execute the program to implement steps of the quasi co-location configuration method described above. An embodiment of the present disclosure further provides a computer-readable storage medium storing therein a program, wherein the program is configured to be executed by a processor to implement steps of the quasi co-location configuration method described above.

Figure 9:
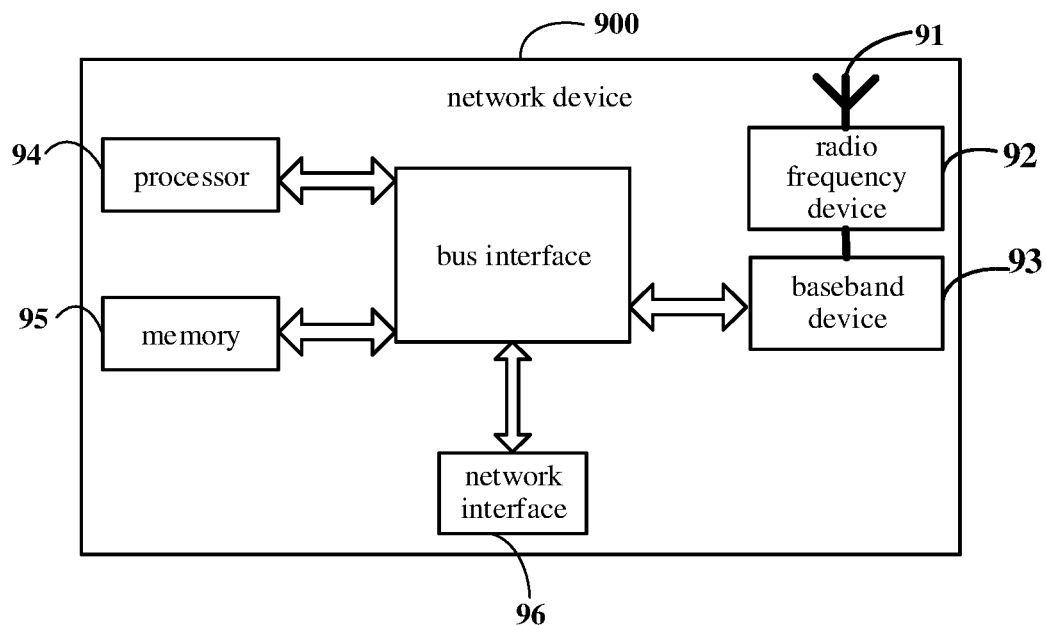
FIG. 9 is a block diagram of a network device according to an embodiment of the present disclosure.

Specifically, a network device is further provided in an embodiment of the present disclosure. As shown in FIG. 9, the network device 900 includes: an antenna 91, a radio frequency device 92 and a baseband device 93. The antenna 91 is connected to the radio frequency device 92. In an uplink direction, the radio frequency device 92 receives information via the antenna 91 and transmits the received information to the baseband device 93 for processing. In a downlink direction, the baseband device 93 processes information to be transmitted and transmits the information to the radio frequency device 92, and the radio frequency device 92 processes the received information and transmits it via the antenna 91.

The frequency band processing device may be arranged in the baseband device 93, and the method performed by the above network device in the embodiments may be implemented in the baseband device 93. The baseband device 93 includes a processor 94 and a memory 95.

The baseband device 93 may include, for example, at least one baseband board on which a plurality of chips are disposed. As shown in FIG. 9, one of the chips is, for example, the processor 94, which is connected to the memory 95 to invoke a program in the memory 95 to perform an operation of the network device as shown in the above method embodiment.

The baseband device 93 may further include a network interface 96 for performing information interaction with the radio frequency device 92, and the interface is, for example, a common public radio interface (CPRI).

The processor here may be a processor or a collective name of a plurality of processing components. For example, the processor may be a CPU, an ASIC, or one or more integrated circuits configured to implement the method performed by the above network device, e.g., one or more microprocessors DSP, or one or more field programmable gate arrays FPGA, etc. The storage element may be a memory or a collective name of a plurality of storage elements.

The memory 95 may be either a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM) or a flash memory. The volatile memory may be a random access memory (RAM) that acts as an external cache. By way of example and not limitation, many forms of RAMs are available, such as a static random access memory (SRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a Synchlink dynamic random access memory (SLDRAM) and a direct rambus random access memory (DRRAM). The memory 95 described herein is intended to include, but is not limited to, these and any other suitable types of memories.

Specifically, the network device of the embodiment of the present disclosure further includes: a program stored in the memory 95 and configured to be executed by the processor 94. The processor 94 invokes the program in the memory 95 to execute the method performed by various modules as shown in FIG. 8.

Specifically, the program is configured to be invoked by the processor 94 to implement the following steps: configuring an aperiodic reference signal quasi-co-located with a physical channel or a physical signal; and transmitting a first signaling indicating a preset manner; wherein it is determined, by a terminal according to the preset manner indicated by the first signaling, that the aperiodic reference signal or a target physical signal associated with the aperiodic reference signal is a quasi co-location signal of the physical channel or the physical signal.

Specifically, the program is configured to be invoked by the processor 94 to implement the following step: configuring an association relationship between the aperiodic reference signal and the target physical signal according to a quasi co-location relationship indicated by a high-layer signaling.

A quasi co-location type of a quasi co-location relationship between the physical channel or the physical signal and the target physical signal is the same as a quasi co-location type of a quasi co-location relationship between the physical channel or the physical signal and the aperiodic reference signal.

The preset manner is such that following step is performed by the terminal: in a case that the aperiodic reference signal is received within a first time window, determining that the aperiodic reference signal is the quasi co-location signal of the physical channel or the physical signal; or in a case that the aperiodic reference signal is not received within the first time window, determining that the target physical signal associated with the aperiodic reference signal is the quasi co-location signal of the physical channel or the physical signal; or in a case that the aperiodic reference signal and the target physical signal associated with the aperiodic reference signal are received within the first time window, determining that one, closest to the physical channel or the physical signal, of the aperiodic reference signal and the target physical signal is the quasi co-location signal of the physical channel or the physical signal.

The first signaling includes: a DCI signaling, a high-layer signaling or a medium access control MAC layer signaling.

Specifically, the program is configured to be invoked by the processor 94 to implement the following step: transmitting a second signaling indicating a parameter of the first time window.

The second signaling includes: a DCI signaling, a high-layer signaling or a medium access control MAC layer signaling.

The parameter of the first time window includes at least one of a window length, a start position or an end position, and the window length is a period length of a periodic signal associated with the aperiodic reference signal.

The aperiodic reference signal includes at least one of an aperiodic tracking reference signal TRS or an aperiodic channel state information reference signal CSI-RS.

In a case that the aperiodic reference signal is the aperiodic TRS, the target physical signal is a periodic TRS; and in a case that the aperiodic reference signal is the aperiodic CSI-RS, the target physical signal is at least one of a periodic TRS, an aperiodic TRS, a synchronization signal and PBCH block SSB, a periodic CSI-RS, a semi-persistent CSI-RS or an aperiodic CSI-RS.

The aperiodic reference signal and the target physical signal are on different carriers or in different cells, or the aperiodic reference signal and the target physical signal are on a same carrier or in a same cell.

The physical channel includes at least one of a physical downlink shared channel PDSCH or a physical downlink control channel PDCCH, and the physical signal includes at least one of a demodulation reference signal DMRS or a channel state information reference signal CSI-RS.

The network device may be a base transceiver station (BTS) in the global system of mobile communication (GSM) or the code division multiple access (CDMA), a NodeB (NB) in the wideband code division multiple access (WCDMA), an evolutional Node B (eNB or eNodeB) in LTE, a relay station or an access point, a base station in future 5G network, or the like, which is not limited herein.

In the embodiment of the present disclosure, the network device configures the aperiodic reference signal for the physical channel or the physical signal, and the terminal may determine the quasi co-location parameter of the physical channel or the physical signal in accordance with the aperiodic reference signal or the target physical signal associated with the aperiodic reference signal, such that it is ensured that the large-scale parameter of the physical channel or the physical signal is determined, thereby ensuring the normal transmission of the physical channel or the physical signal.

A person skilled in the art may be aware that, the exemplary units and algorithm steps described in connection with the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the disclosure.

It may be clearly understood by a person skilled in the art that, for ease of description and conciseness, for a detailed working process of the foregoing system, apparatus, and unit, reference may be made to a corresponding process in the foregoing method embodiments, and details are not described herein again.

In the several embodiments provided in the present application, it should be understood that the disclosed device and method may be implemented in other manners. For example, the described device embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the devices or units may be implemented in electric, mechanical, or other forms.

The units described as separate parts may or may not be physically separate, and parts displayed as units may or may not be physical units, that is, may be located in one position, or may be distributed on a plurality of network units. A part or all of the units may be selected according to actual needs to achieve the objectives of the solutions of the embodiments.

In addition, functional units in the embodiments of the present disclosure may be integrated into one processing unit, or each of the units may exist alone physically, or two or more units may be integrated into one unit.

If the functions are implemented in a form of a software functional unit and sold or used as an independent product, the functions may be stored in a computer-readable storage medium. Based on such an understanding, the technical solutions of the present disclosure essentially, or the part contributing to the prior art, or a part of the technical solutions may be implemented in a form of a software product. The software product is stored in a storage medium, and includes several instructions for instructing a computer device (which may be a personal computer, a server, or a network device) to perform all or a part of the steps of the methods described in the embodiments of the disclosure. The foregoing storage medium includes any medium that can store program code, such as a USB flash drive, a removable hard disk, an ROM, an RAM, a magnetic disk, or an optical disc.

In addition, it should be noted that in the apparatus and the method of the present disclosure, apparently, parts or steps may be divided and/or re-combined. The divisions and/or re-combinations should be regarded as equivalent solutions of the present disclosure. Moreover, steps of the above series of processes may be performed naturally in a time order of description. However, the performing sequence is not limited to the time order. Some steps may be performed in parallel or independently. Persons of ordinary skill in the art would appreciate that all or any steps or parts of the methods and apparatuses of the present disclosure may be implemented in any computing apparatus (including a processor, a storage medium or the like) or a network of computing apparatuses in hardware, firmware, software or a combination thereof, and this can be achieved by persons of ordinary skill in the art by using their basic programming skill after reading the description of the present disclosure.

Thus, the objective of the present disclosure may also be implemented by running a program or a set of programs on any computing apparatus. The computing apparatus may be a known general purpose apparatus. Thus, the object of the present disclosure may also be implemented merely by providing a program product which contains program code for implementing the methods or apparatuses. That is, such program product also constitutes the present disclosure, and a storage medium in which such a program product is stored also constitutes the present disclosure. Apparently, the storage medium may be any known storage medium or any storage medium that will be developed in the future. It should also be noted that, in the apparatuses and methods of the present disclosure, apparently, parts or steps may be divided and/or re-combined. The divisions and/or re-combinations should be regarded as equivalent solutions of the present disclosure. Moreover, steps of the foregoing series of processes may be performed naturally in a time order of description, however the performing sequence is not limited to the time order. Some steps may be performed in parallel or independently.

The foregoing describes optional implementations of the present disclosure. It should be noted that for a person of ordinary skill in the art, several improvements and modifications may further be made without departing from the principle of the present disclosure. These improvements and modifications should also be deemed as falling within the scope of the present disclosure.

What is claimed is:

1. A quasi co-location configuration method, applied to a terminal side, comprising:
   in a case that a network device configures an aperiodic reference signal quasi-co-located with a physical channel or a physical signal, determining, according to a preset manner, that the aperiodic reference signal or a target physical signal associated with the aperiodic reference signal is a quasi co-location signal of the physical channel or the physical signal;
   wherein an association relationship between the aperiodic reference signal and the target physical signal is determined according to a quasi co-location relationship indicated by a high-layer signaling transmitted by the network device.

2. The quasi co-location configuration method according to claim 1, wherein a quasi co-location type of a quasi co-location relationship between the physical channel or the physical signal and the target physical signal is the same as a quasi co-location type of a quasi co-location relationship between the physical channel or the physical signal and the aperiodic reference signal.

3. The quasi co-location configuration method according to claim 1, wherein the determining, according to the preset manner, that the aperiodic reference signal or the target physical signal associated with the aperiodic reference signal is the quasi co-location signal of the physical channel or the physical signal comprises:
   in a case that the aperiodic reference signal is received within a first time window, determining that the aperiodic reference signal is the quasi co-location signal of the physical channel or the physical signal; or
   in a case that the aperiodic reference signal is not received within the first time window, determining that the target physical signal associated with the aperiodic reference signal is the quasi co-location signal of the physical channel or the physical signal; or
   in a case that the aperiodic reference signal and the target physical signal associated with the aperiodic reference signal are received within the first time window, determining that one, closest to the physical channel or the physical signal, of the aperiodic reference signal and the target physical signal is the quasi co-location signal of the physical channel or the physical signal.

4. The quasi co-location configuration method according to claim 1, wherein the determining that the aperiodic reference signal is the quasi co-location signal of the physical channel or the physical signal comprises:
   determining that a received aperiodic reference signal closest to the physical channel or the physical signal is the quasi co-location signal of the physical channel or the physical signal.

5. The quasi co-location configuration method according to claim 3, wherein the parameter of the first time window comprises at least one of a window length, a start position or an end position, wherein the window length is a period length of a periodic signal associated with the aperiodic reference signal.

6. The quasi co-location configuration method according to claim 1, wherein the aperiodic reference signal comprises at least one of an aperiodic tracking reference signal (TRS) or an aperiodic channel state information reference signal (CSI-RS).

7. The quasi co-location configuration method according to claim 6, wherein in a case that the aperiodic reference signal is the aperiodic TRS, the target physical signal is a periodic TRS;
   in a case that the aperiodic reference signal is the aperiodic CSI-RS, the target physical signal is at least one of a periodic TRS, an aperiodic TRS, a synchronization signal and PBCH block (SSB), a periodic CSI-RS, a semi-persistent CSI-RS or an aperiodic CSI-RS.

8. The quasi co-location configuration method according to claim 6, wherein in a case that the aperiodic reference signal is the aperiodic CSI-RS, the determining, according to the preset manner, that the target physical signal associated with the aperiodic reference signal is the quasi co-location signal of the physical channel or the physical signal comprises:
   in a case that a first target physical signal associated with the aperiodic CSI-RS is not received within a second time window, determining, according to the preset manner, that a second target physical signal associated with the first target physical signal is the quasi co-location signal of the physical channel or the physical signal.

9. The quasi co-location configuration method according to claim 1, wherein the physical channel comprises at least one of a physical downlink shared channel (PDSCH) or a physical downlink control channel (PDCCH), and the physical signal comprises at least one of a demodulation reference signal (DMRS) or a channel state information reference signal (CSI-RS).

10. A terminal, comprising a processor, a memory and a program stored in the memory and configured to be executed by the processor, wherein the processor is configured to execute the program to implement following step:
   in a case that a network device configures an aperiodic reference signal quasi-co-located with a physical channel or a physical signal, determining, according to a preset manner, that the aperiodic reference signal or a target physical signal associated with the aperiodic reference signal is a quasi co-location signal of the physical channel or the physical signal;
   wherein an association relationship between the aperiodic reference signal and the target physical signal is determined according to a quasi co-location relationship indicated by a high-layer signaling transmitted by the network device.

11. The terminal according to claim 10, wherein a quasi co-location type of a quasi co-location relationship between the physical channel or the physical signal and the target physical signal is the same as a quasi co-location type of a quasi co-location relationship between the physical channel or the physical signal and the aperiodic reference signal.

12. The terminal according to claim 10, wherein the determining, according to the preset manner, that the aperiodic reference signal or the target physical signal associated with the aperiodic reference signal is the quasi co-location signal of the physical channel or the physical signal comprises:

in a case that the aperiodic reference signal is received within a first time window, determining that the aperiodic reference signal is the quasi co-location signal of the physical channel or the physical signal; or in a case that the aperiodic reference signal is not received within the first time window, determining that the target physical signal associated with the aperiodic reference signal is the quasi co-location signal of the physical channel or the physical signal; or in a case that the aperiodic reference signal and the target physical signal associated with the aperiodic reference signal are received within the first time window, determining that one, closest to the physical channel or the physical signal, of the aperiodic reference signal and the target physical signal is the quasi co-location signal of the physical channel or the physical signal.

13. The terminal according to claim 10, wherein the determining that the aperiodic reference signal is the quasi co-location signal of the physical channel or the physical signal comprises:

determining that a received aperiodic reference signal closest to the physical channel or the physical signal is the quasi co-location signal of the physical channel or the physical signal.

14. The terminal according to claim 12, wherein the parameter of the first time window comprises at least one of a window length, a start position or an end position, wherein the window length is a period length of a periodic signal associated with the aperiodic reference signal.

15. The terminal according to claim 10, wherein the aperiodic reference signal comprises at least one of an aperiodic tracking reference signal (TRS) or an aperiodic channel state information reference signal (CSI-RS).

16. The terminal according to claim 15, wherein in a case that the aperiodic reference signal is the aperiodic TRS, the target physical signal is a periodic TRS;

in a case that the aperiodic reference signal is the aperiodic CSI-RS, the target physical signal is at least one of a periodic TRS, an aperiodic TRS, a synchronization signal and PBCH block (SSB), a periodic CSI-RS, a semi-persistent CSI-RS or an aperiodic CSI-RS.

17. The terminal according to claim 15, wherein in a case that the aperiodic reference signal is the aperiodic CSI-RS, the determining, according to the preset manner, that the target physical signal associated with the aperiodic reference signal is the quasi co-location signal of the physical channel or the physical signal comprises:

in a case that a first target physical signal associated with the aperiodic CSI-RS is not received within a second time window, determining, according to the preset manner, that a second target physical signal associated with the first target physical signal is the quasi co-location signal of the physical channel or the physical signal.

18. A non-transitory computer-readable storage medium, storing therein a program, wherein the program is configured to be executed by a processor to implement following step:

in a case that a network device configures an aperiodic reference signal quasi-co-located with a physical channel or a physical signal, determining, according to a preset manner, that the aperiodic reference signal or a target physical signal associated with the aperiodic reference signal is a quasi co-location signal of the physical channel or the physical signal;

wherein an association relationship between the aperiodic reference signal and the target physical signal is determined according to a quasi co-location relationship indicated by a high-layer signaling transmitted by the network device.

19. The non-transitory computer-readable storage medium according to claim 18, wherein a quasi co-location type of a quasi co-location relationship between the physical channel or the physical signal and the target physical signal is the same as a quasi co-location type of a quasi co-location relationship between the physical channel or the physical signal and the aperiodic reference signal.

20. The non-transitory computer-readable storage medium according to claim 18, wherein the determining, according to the preset manner, that the aperiodic reference signal or the target physical signal associated with the aperiodic reference signal is the quasi co-location signal of the physical channel or the physical signal comprises:

in a case that the aperiodic reference signal is received within a first time window, determining that the aperiodic reference signal is the quasi co-location signal of the physical channel or the physical signal; or in a case that the aperiodic reference signal is not received within the first time window, determining that the target physical signal associated with the aperiodic reference signal is the quasi co-location signal of the physical channel or the physical signal; or in a case that the aperiodic reference signal and the target physical signal associated with the aperiodic reference signal are received within the first time window, determining that one, closest to the physical channel or the physical signal, of the aperiodic reference signal and the target physical signal is the quasi co-location signal of the physical channel or the physical signal.

* * * * *